United States Patent
Cole et al.

[11] Patent Number: 5,911,296
[45] Date of Patent: Jun. 15, 1999

[54] CLUTCH WITH ROLLER FORK

[75] Inventors: Christopher D. Cole, Fort Wayne; Daniel V. Gochenour, Auburn, both of Ind.

[73] Assignee: Eaton Corporation, Cleveland, Ohio

[21] Appl. No.: 08/886,375

[22] Filed: Jul. 1, 1997

[51] Int. Cl.[6] .............................. F16D 13/50; F16D 23/14
[52] U.S. Cl. .................................. 192/70.29; 192/89.26; 192/98; 192/99 S
[58] Field of Search ............................ 192/70.27, 70.29, 192/70.3, 89.26, 99 A, 99 S, 98, 82 R; 74/473.36, 473.37

[56] References Cited

U.S. PATENT DOCUMENTS

| | | | |
|---|---|---|---|
| 1,446,657 | 2/1923 | Parsons | 192/99 S |
| 1,611,557 | 12/1926 | Reed | 192/98 |
| 2,163,897 | 6/1939 | Taylor | 192/99 S X |
| 2,354,621 | 7/1944 | Spase | 192/98 |
| 2,876,882 | 3/1959 | Kelleigh | 192/82 R X |
| 2,973,849 | 3/1961 | Sabatt . | |
| 3,394,788 | 7/1968 | Sink | 192/89.26 |
| 4,720,002 | 1/1988 | Kitano et al. | 192/70.29 X |
| 4,997,075 | 3/1991 | Nakamura et al. | 192/98 |

FOREIGN PATENT DOCUMENTS 1194714  11/1985  U.S.S.R. ............................ 192/99 S

OTHER PUBLICATIONS

Figures T4X5766 and T4X5767 from TSI (Clutch, Pull–Type Volvo, Manual No. 411–600) Date not given.

*Primary Examiner*—Richard M. Lorence
*Attorney, Agent, or Firm*—Dykema Gossett PLLC

[57] ABSTRACT

A heavy duty clutch release mechanism includes a clutch release sleeve, a clutch release bearing and a clutch release fork. The clutch release sleeve has a lever engagement feature at a first end. The clutch release bearing engages a second end of the clutch release sleeve and has an inner race rotatably fixed to the second end of the clutch release sleeve. The clutch release fork has rollers disposed on each of two arms for engagement with an outer race of the clutch release bearing.

13 Claims, 3 Drawing Sheets

CLUTCH WITH ROLLER FORK

FILED OF THE INVENTION

This invention relates to motor vehicle clutches, and in particular, clutches employing a release sleeve disposed between a release bearing and sleeve end engaging a clutch spring and/or clutch levers, and the means for displacing release bearings associated with such clutches.

BACKGROUND OF THE INVENTION

Clutches designed for use in heavy and medium duty applications commonly employ sleeves which ride on a transmission input shaft. The sleeve connects a release bearing with a clutch spring and/or clutch levers which provide the clutch engagement load against the pressure plate. The sleeve is disposed over the transmission input shaft and rotates with the spring, as well as the cover, flywheel and pressure plate of the clutch. A bushing in axial alignment with the bearing is press fit in the sleeve for unitary rotation therewith and rides directly on the transmission input shaft. Relative rotation between the sleeve and the transmission input shaft occurs when the clutch is partially or fully released. An inner race of the release bearing is connected to the sleeve for movement therewith. An outer race is prevented from rotating, and is in engagement with a clutch fork. Wear pads on the outer race are engaged by the ends of the fork's arms. The clutch fork is pivotably mounted in a clutch housing connecting an engine block and a transmission case. The clutch fork is connected with an operator controlled pedal for selective axial displacement of the bearing and sleeve and the consequent disengagement of the clutch.

The pivotal motion of the clutch fork, in combination with the frictional force between the fork arms and the wear pads, induces an "uplift" force on the bearing which is transferred through the bearing to the sleeve and to the bushing therein. The uplift force is approximately equal to the coefficient of friction between the fork arms and the pads multiplied by the normal force applied by the arms against the pads. The uplift force presses the sleeve bushing against the input shaft during clutch disengagements, thereby accelerating wear of the sleeve bushing.

Original equipment manufacturers of vehicles (OEMs) are now requiring that clutches be substantially maintenance free for extended mileage periods. To increase the life of sleeve bushings, it is highly desired to reduce the friction between the fork and the release bearing and thereby reduce the uplift force.

Clutch forks are known which employ rollers to engage the release bearings of those clutches. However, those forks are used in combination with clutch bearings which ride not on the transmission input shaft, but on a stationary quill extending from the transmission case and circumscribing but not touching the input shaft. Additionally, known roller forks are not appropriately configured to enable them to be substituted into existing clutch systems having very limited space within the clutch housing.

It is desired to provide a low friction clutch fork to release bearing interface which will reduce sleeve bushing wear. It is further desired to provide such a clutch fork and release bearing combination which fits in the space available for a conventional fork and release bearing combination.

SUMMARY OF THE INVENTION

A clutch release mechanism includes a clutch release sleeve, a clutch release bearing and a clutch release fork. The clutch release sleeve has a lever engagement feature at a first end. The clutch release bearing engages a second end of the clutch release sleeve and has an inner race rotatably fixed to the second end of the clutch release sleeve. The clutch release fork has rollers disposed on each of two arms for engagement with an outer race of the clutch release bearing.

A clutch includes a flywheel, a transmission input shaft, a clutch cover, a pressure plate, a clutch driven disc, a clutch release sleeve, a plurality of radially oriented levers, a spring, a release bearing, a clutch housing, a clutch release shaft, a clutch release fork, and rollers. The flywheel is rotatably disposed on an axis of rotation. The transmission input shaft is disposed on the axis of rotation and has a splined portion. The clutch cover is fixed to the flywheel. The pressure plate is disposed between the clutch cover and the flywheel for axial movement therebetween, and is rotatably fixed to the cover. The clutch driven disc is rotatably fixed to the input shaft through the splines and is disposed between the flywheel and the pressure plate for axial slidable movement therebetween. The clutch release sleeve is slidably disposed over the input shaft and has a first end disposed between the pressure plate and the cover, and a second end disposed on a side of the cover opposite the pressure plate. The plurality of radially oriented levers are distributed about the axis of rotation. The levers have radially inwardly disposed ends engaging a first end of the release sleeve. The levers extend between the release sleeve and the pressure plate or spring. The spring is disposed between the pressure plate and the cover and biases the pressure plate toward the driven disc. The clutch release bearing is disposed at the second end of the release sleeve, outside the clutch cover. The clutch housing is disposed over the clutch cover and the release bearing. The clutch release shaft is rotatably disposed in the clutch housing and is pivotable about a pivot axis oriented at 90° to the axis of rotation. The clutch release fork is fixed to the clutch release shaft for rotation therewith and has first and second arms extending adjacent to the release bearing. The rollers are rotatably disposed on each of the first and second arms of the clutch release fork, and are in engagement with the release bearing.

The inventive clutch and clutch release mechanism which employ a fork with rollers are highly effective at reducing friction between the fork and the release bearing and advantageously reduce the wear of the sleeve busing. The disclosed fork and bearing combination are advantageously configured to fit within a clutch housing having a very limited amount of space.

DETAILED DESCRIPTION OF PREFERRED EMBODIMENTS

Figure 1:
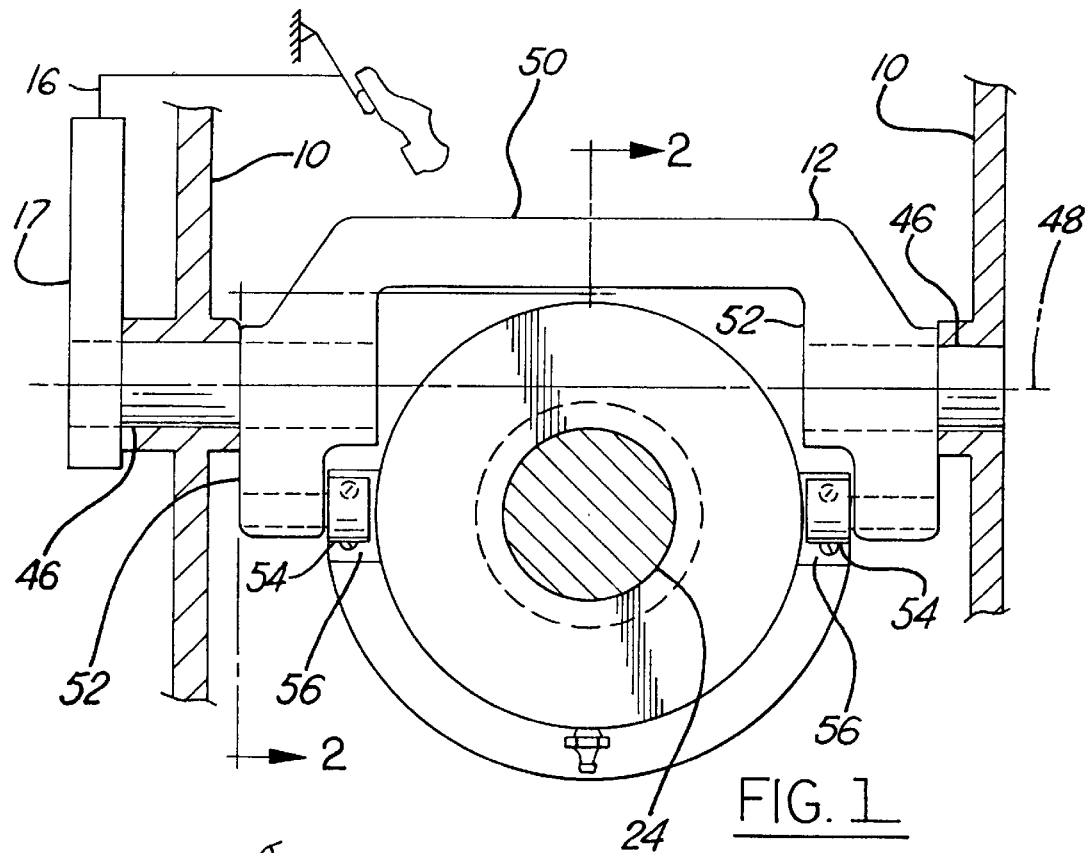
FIG. 1 is a rearward facing end view of a clutch release bearing and clutch fork.
Figure 2:
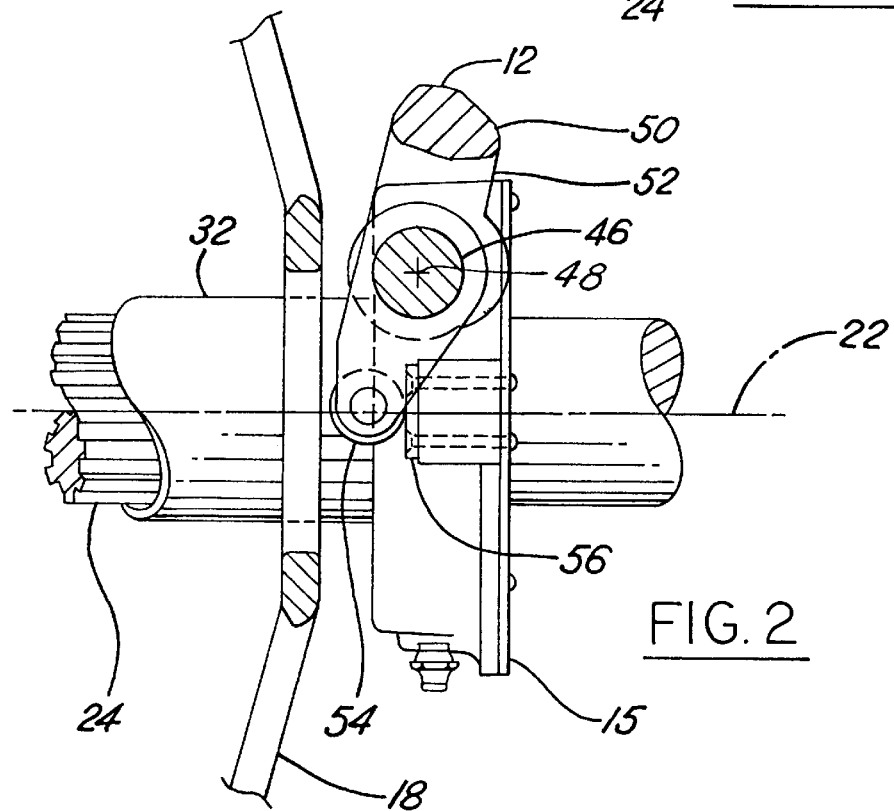
FIG. 2 is a side view of the release bearing and fork of FIG. 1 shown in the direction of arrows 2.
Figure 4:
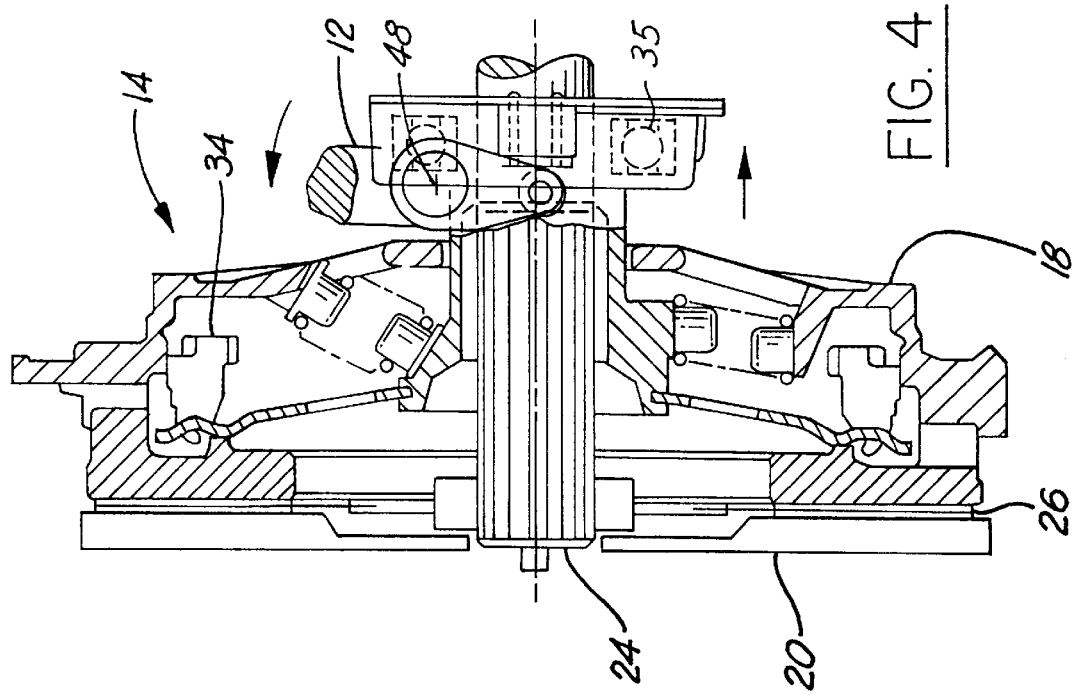
FIG. 4 is a sectional side view of the clutch assembly of FIG. 3 in a released position.

FIG. 1 shows a clutch housing 10 pivotably supporting a clutch fork 12. Clutch fork 12 is used to selectively disengage clutch assembly 14, best shown in FIGS. 3 and 4, though displacement of clutch release bearing assembly 15. A clutch linkage 16 disposed between a vehicle operator and the clutch fork 12 includes an operating lever 17 disposed outside of clutch housing 10.

Clutch assembly 14 includes a clutch cover 18 fixed to a flywheel 20. Flywheel 20 is in turn fixed to an engine crankshaft (not shown) for rotation about an axis of rotation 22. A transmission input shaft 24, splined on a first end, extends from a transmission case (not shown) along axis 22. A driven disc 26 is slidably disposed on the splined portion of input shaft 24 for rotation therewith. A pressure plate 28 compresses driven disc 26 between itself and flywheel 20. Six clutch apply levers 30 are circumferentially distributed about axis 22, and extend radially from a first end of a release sleeve 32. A radially outer end of each lever 30 engages cover 18 directly, or indirectly through an adjusting mechanism 34.

An inner race 36 of release bearing assembly 15 is engaged with release sleeve 32 for axial movement therewith. A snap ring helps retain inner race 36 on sleeve 32. An input shaft bushing 37 is press-fit in sleeve 32 in axial alignment with bearing assembly 15. An outer race 38, rotatably fixed to a bearing housing 39, is prevented from rotating relative to clutch housing 10. The outer race 38 is separated from the inner race by bearing members 35.

Angle springs 40, which develop the clutch apply loads, are disposed between clutch cover 18 and the first end of sleeve 32. Both the sleeve 32 and cover 18 have corresponding spring engaging features 42 and 44 respectively.

Clutch fork 12 straddles bearing 15 and is fixed to two coaxial fork shafts 46 for pivoting about pivot axis 48. Operating lever 17 is fixed to one of fork shafts 46. A cross member 50 of fork 12 connects two opposed arms 52 adjacent bearing assembly 15. Each of arms 52 have rollers 54 disposed on dowel pins 58 extending inboard from near the ends of arms 52. Rollers 54 engage wear pads 56 on a forward side of bearing assembly 15.

Figure 6:
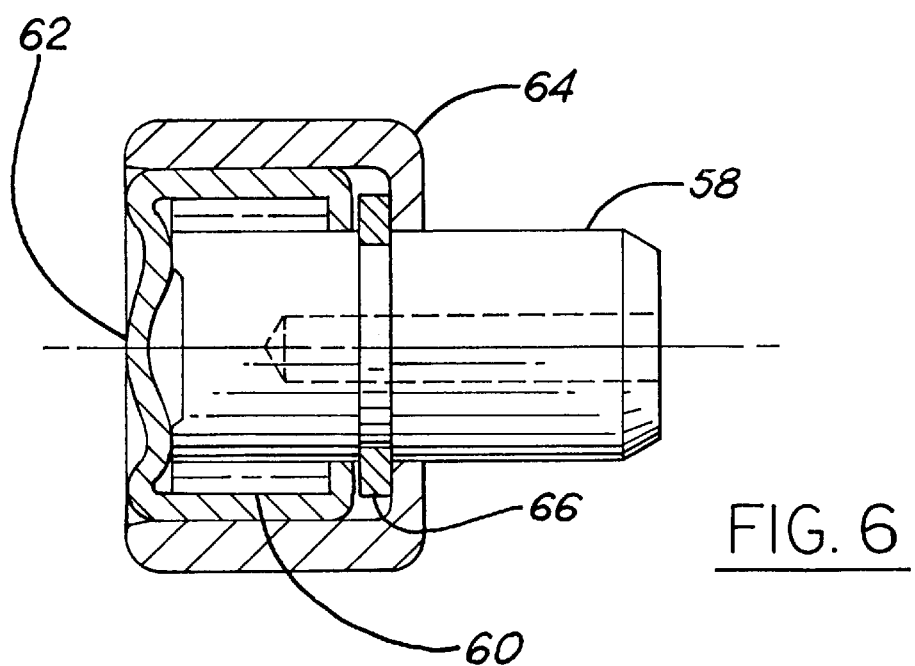
FIG. 6 is a side view of a roller used with the fork of FIGS. 1–4.

The roller 54 is shown in more detail in FIG. 6. A dowel pin 58 has a first end received by one of the arms 52. A second end of pin 58 supports needle roller 60 retained by a cup 62. An outer housing 64 encloses cup 62 and serves as a roller surface. A retaining ring 66 disposed in a groove in dowel pin 58 helps retain housing 64 and cup 62. All of the elements of the illustrated roller 54 are formed of steel. Alternate roller designs include the use of ball bearing elements in place of needle rollers, or a Teflon coated bushing riding directly on the dowel pin.

Roller 54 and release bearing assembly 15 are designed as a matched set so that the axial position of sleeve 32 varies as a function of the rotative position of lever 17 exactly as the position of sleeve 32 would vary with the position of lever 17 in a non-roller system. This allows the roller fork 12 to be installed in a system not explicitly designed for compatibility with a roller fork. The arms 52 of fork 12 have been widened to make them more resistant to the torsional twisting force introduced by the cantilevered rollers 54.

Figure 3:
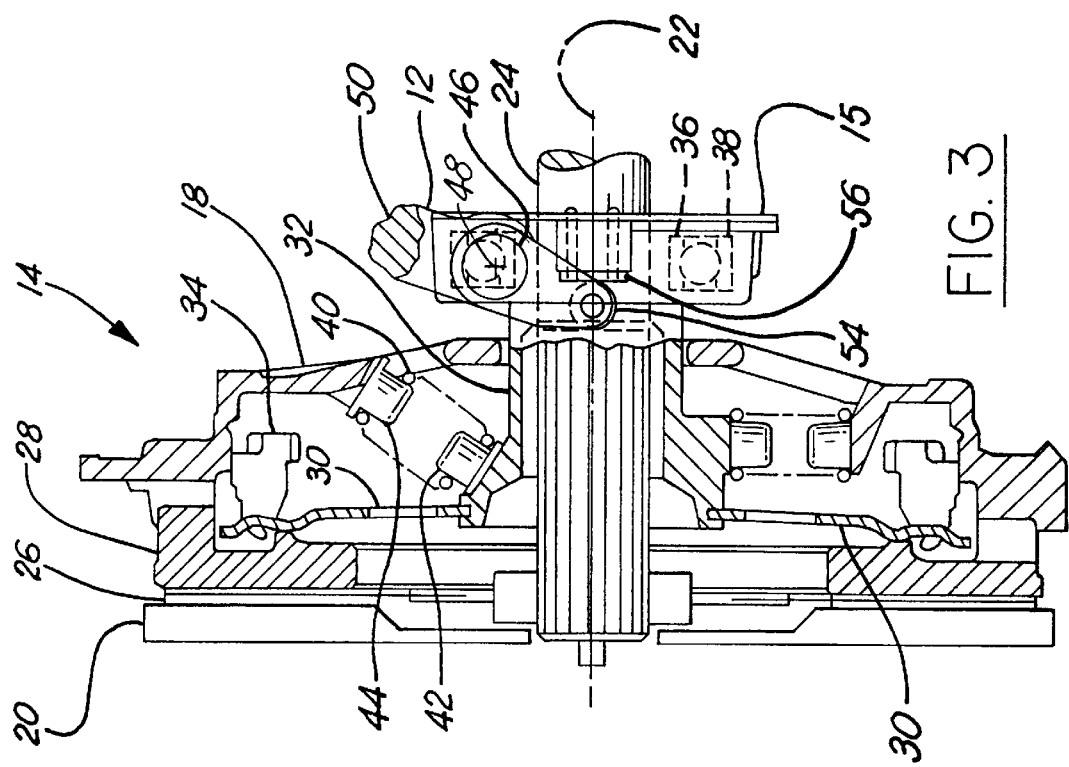
FIG. 3 is a sectional side view of a clutch assembly employing the release bearing and fork of FIG. 2 and shown in a disengaged position.
Figure 5:
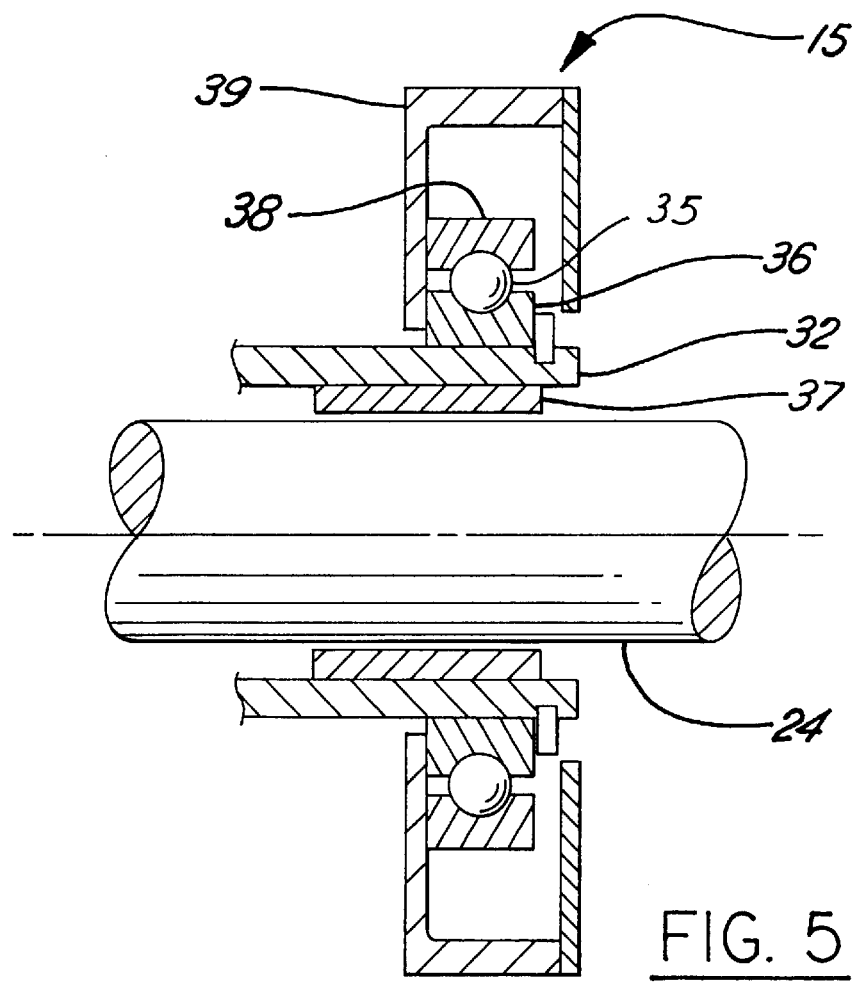
FIG. 5 is a sectional side view of the release bearing of FIG. 1.

The invention operates in the following manner. FIG. 3 shows the clutch in an engaged condition. The position of clutch fork 12 and lever 17 is controlled by the position of release bearing assembly 15, which is in turn controlled by the travel limits of levers 30 against pressure plate 28, responsive to the force of springs 40. When the clutch is released by the operator through linkage 16, operating lever 17 rotates clutch fork 12 to the position shown in FIG. 4, axially displacing release bearing assembly 15 rearwardly against the force of springs 40 to unload pressure plate 28. The unloading of pressure plate 28 unclamps driven disc 26, enabling relative rotation between driven disc 26 and pressure plate and flywheel 28 and 20. The second or pivot axis 48 is now forward of, or closer to the flywheel than, the bearing members. The pivot axis 48 remains closer to the rotative axis than the outer race 38.

As fork 12 is pivoted to the disengaged position, rollers 50 move in a first direction along wear pads 56. As the clutch is reengaged by the operator, rollers 54 move in a second direction, opposite the first direction, along wear pads 56. Rollers 54 prevent the undesired wear of sleeve 37 by eliminating substantially all of the frictional drag of fork 12 against pads 56.

It should be appreciated that many alternative embodiments are readily apparent to those skilled in the art of clutches. For example, a diaphragm spring may be used in place of angle springs 40. Yet alternatively, a diaphragm spring may be used in place of both diaphragm spring 40 and levers 30. In such an embodiment, radially inward extending fingers of the diaphragm spring would serve as the levers. Displacement of the radially inwardly disposed ends of the levers causes the pressure plate to be selectively unloaded by deflecting an annular radially outer portion of the spring. The annular radially outer portion of the spring is disposed directly between the pressure plate 28 and the cover 18, instead of indirectly as shown in the preferred embodiment, with spring 40 having one end acting on cover 18 and a second end acting on sleeve 32 which acts on lever 30 which acts on pressure plate 28. However, in both embodiments, displacement of the sleeve results in deflection of the spring or springs.

In light of these and other possible variations of the invention, the scope of the invention as defined by the appended claims is not limited to the above disclosed preferred embodiment.

We claim:

1. A clutch for rotatably connecting a motor vehicle engine crankshaft with a transmission input shaft, the clutch comprising:

a flywheel rotatably disposed on an axis of rotation;

a transmission input shaft disposed on the axis of rotation and having a splined portion;

a clutch cover fixed to the flywheel;

a pressure plate disposed between the clutch cover and the flywheel for axial movement therebetween and rotatably fixed to the cover;

a clutch driven disc rotatably fixed to the input shaft through the splined portion and disposed between the flywheel and the pressure plate for axially slidable movement therebetween;

a clutch release sleeve slidably and rotatably disposed on the input shaft having a first end disposed between the pressure plate and the cover and having a second end disposed on a side of the cover opposite the pressure plate;

a plurality of radially oriented levers distributed about the axis of rotation and having radially inwardly disposed ends engaging a first end of the release sleeve and the levers extending between the release sleeve and the pressure plate;

a spring disposed between the pressure plate and the cover biasing the pressure plate toward the driven disc;

a clutch release bearing assembly connected to a second end of the release sleeve and disposed outside the clutch cover and the clutch release bearing assembly also having an engagement surface, the clutch release bearing assembly having an outer non-rotational race separated from an inner race by bearing members;

a clutch housing disposed over the clutch cover and the release bearing;

a clutch release shaft rotatably disposed in the clutch housing and pivotable about a second axis oriented at 90° to the axis of rotation, the second axis being closer to the axis of rotation than the clutch release bearing assembly outer race;

a clutch release fork rotatably fixed to the clutch release shaft for rotation therewith and having first and second arms extending adjacent to the release bearing assembly; and a plurality rollers of rotatably disposed on an inboard side of each of the first and second arms of the clutch release fork and in engagement with the engagement surface of the clutch release bearing assembly.

2. A clutch as claimed in claim 1 wherein the clutch release bearing assembly and rollers are configured as a set to provide a predetermined relationship between an angle of rotation of the clutch release shaft and an axial position of the clutch release sleeve.

3. A clutch release mechanism comprising:

a clutch release sleeve having a lever engagement feature at a first end and a rotational axis;

a clutch release bearing assembly engaging a second end of the clutch release sleeve and having an inner race rotatably fixed to the second end of the clutch release sleeve and having an outer nonrotational race separated from the inner race by a bearing member; and a clutch release fork having rollers disposed on each of two arms for engagement with the clutch release bearing assembly, the clutch release fork having a pivotal axis closer to the rotational axis than the outer race and the fork pivotal axis being forward of the bearing members when the clutch release bearing assembly is moved by the clutch release fork to a released position.

4. A heavy duty clutch release mechanism as claimed in claim 3 wherein the rollers are mounted on an inboard side of the arms.

5. A clutch release mechanism as claimed in claim 3 wherein the release bearing and rollers are configured as a set to provide a predetermined relationship between an angle of rotation of the clutch release shaft and an axial position of the clutch release sleeve.

6. A clutch for rotatably connecting a motor vehicle engine crankshaft with a transmission input shaft, the clutch comprising:

a flywheel rotatably disposed on an axis of rotation;

a transmission input shaft disposed on the axis of rotation and having a splined portion;

a clutch cover fixed to the flywheel;

a pressure plate disposed between the clutch cover and the flywheel for axial movement therebetween and rotatably fixed to the cover;

a clutch driven disc rotatably fixed to the input shaft through the splined portion and disposed between the flywheel and the pressure plate for axially slidable movement therebetween;

a clutch release sleeve slidably and rotatably disposed on the input shaft having a first end disposed between the pressure plate and the cover and having a second end disposed on a side of the cover opposite the pressure plate;

a plurality of radially oriented levers distributed about the axis of rotation and having radially inwardly disposed ends engaging a first end of the release sleeve and the levers extending between the release sleeve and the pressure plate;

a spring disposed between the pressure plate and the cover biasing the pressure plate toward the driven disc;

a clutch release bearing assembly connected to a second end of the release sleeve and disposed outside the clutch cover and the clutch release bearing assembly also having an engagement surface, the clutch release bearing assembly having an outer non-rotational race separated from an inner race by having members;

a clutch housing disposed over the clutch cover and the release bearing;

a clutch release shaft rotatably disposed in the clutch housing and pivotable about a second axis oriented at 90° to the axis of rotation, the second axis being forward of the clutch release bearing assembly bearing member when the clutch release bearing assembly is moved by the clutch release fork to a released position;

a clutch release fork rotatably fixed to the clutch release shaft for rotation therewith and having first and second arms extending adjacent to the clutch release bearing assembly; and a plurality of rollers rotatably disposed on an inboard side of each of the first and second arms of the clutch release fork and in engagement with the engagement surface of the clutch release bearing assembly.

7. A clutch as claimed in claim 6, wherein the clutch release bearing assembly and rollers are configured as a set to provide a predetermined relationship between an angle of rotation of the clutch release shaft and an axial position of the clutch release sleeve.

8. A clutch as claimed in claim 1, wherein the second axis is forward of the clutch release bearing assembly bearing member when the clutch release bearing assembly is moved by the clutch release fork to a release position.

9. A clutch as described in claim 1, wherein the clutch release sleeve has a bushing inserted therein.

10. A clutch as claimed in claim 6, wherein the second axis is closer to the axis of rotation than the clutch release bearing assembly outer race.

11. A clutch as claimed in claim 1, wherein the clutch release sleeve has a bushing inserted therein.

12. A clutch as described in claim 6, wherein the clutch release sleeve has a bushing inserted therein.

13. A clutch as described in claim 3, wherein the clutch release sleeve has a bushing inserted therein.

\* \* \* \* \*